US008378649B2

United States Patent
Moussaoui

(10) Patent No.: US 8,378,649 B2
(45) Date of Patent: Feb. 19, 2013

(54) VOLTAGE REGULATOR INCLUDING QUASI TRANSITION DIODE EMULATION MODE OF OPERATION

(75) Inventor: Zaki Moussaoui, San Carlos, CA (US)

(73) Assignee: Intersil Americas Inc., Milpitas, CA (US)

( * ) Notice: Subject to any disclaimer, the term of this patent is extended or adjusted under 35 U.S.C. 154(b) by 757 days.

(21) Appl. No.: 12/558,035

(22) Filed: Sep. 11, 2009

(65) Prior Publication Data

US 2010/0066338 A1    Mar. 18, 2010

Related U.S. Application Data

(60) Provisional application No. 61/096,594, filed on Sep. 12, 2008.

(51) Int. Cl.
*G05F 1/40* (2006.01)
(52) U.S. Cl. .......................... 323/271; 323/282
(58) Field of Classification Search ............ 323/222, 323/223, 225, 226, 268, 270, 271, 273–275, 323/282–286
See application file for complete search history.

(56) References Cited

U.S. PATENT DOCUMENTS

| | | | | |
|---|---|---|---|---|
| 6,724,174 | B1 * | 4/2004 | Esteves et al. | 323/224 |
| 6,815,936 | B2 * | 11/2004 | Wiktor et al. | 323/282 |
| 7,205,751 | B2 * | 4/2007 | Rudiak | 323/271 |
| 7,898,227 | B2 * | 3/2011 | Huang et al. | 323/222 |

* cited by examiner

*Primary Examiner* — Matthew Nguyen
(74) *Attorney, Agent, or Firm* — Howison & Arnott, L.L.P.

(57) ABSTRACT

A voltage regulator includes an upper switching transistor connected between an input voltage node and a phase node. A lower switching transistor is connected between the phase node and ground. An output filter is connected between the phase node and an output voltage node. A PWM control circuit generates an PWM control signal responsive to a feedback voltage. An upper gate control circuit controls operation of the upper switching transistor responsive to the PWM control signal. A lower gate control circuit controls operation of the lower switching transistor responsive to the PWM control signal and a ramp voltage signal. The lower gate control circuit linearly increases a lower gate control signal from 0 to (1-D), where D=the duty cycle, to transition the voltage regulator for diode emulation mode of operation to synchronous mode of operation responsive to a first pulse in the PWM control signal.

14 Claims, 3 Drawing Sheets

VOLTAGE REGULATOR INCLUDING QUASI TRANSITION DIODE EMULATION MODE OF OPERATION

CROSS-REFERENCE TO RELATED APPLICATIONS

This application claims priority to U.S. Provisional Patent Application No. 61/096,594, filed Sep. 12, 2008, entitled QUASI TRANSITION DIODE EMULATION, all of which is incorporated herein by reference in its entirety.

BRIEF DESCRIPTION OF THE DRAWINGS

For a more complete understanding, reference is now made to the following description taken in conjunction with the accompanying Drawings in which.

DETAILED DESCRIPTION

Figure 1:
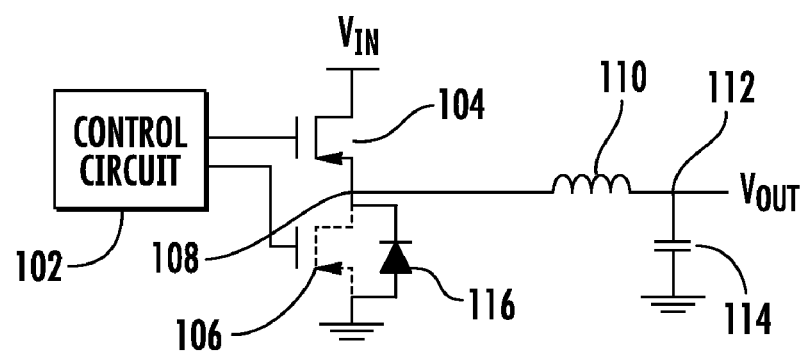
FIG. 1 is a functional block diagram of a buck converter with associated control circuit.

Referring now to the drawings, wherein like reference numbers are used herein to designate like elements throughout, the various views and embodiments of a voltage regulator including quasi transition diode emulation mode of operation are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

A buck converter is a type of voltage regulator that provides a regulated voltage when provided with a reference voltage. When a buck converter is in a pre-bias condition with a voltage on its output during start up, the output capacitor of the buck converter should not be discharged when the controller associated with the buck converter is starting up. Many existing solutions incur overshoot or undershoot conditions wherein the output voltage rises above or falls below desired maximum or minimum conditions which occur during transitions of the buck regulator from a diode emulation mode of operation to a synchronous mode of operation. The diode emulation mode of operation involves leaving a lower gate switching transistor of the buck converter in an off state to use the parasitic diode of the lower switch while providing switching signals to only the upper gate switching transistor. The synchronous mode of operation involves providing switching signals to both the upper and lower gate switching transistors of the buck converter.

Referring now to the drawings, and more particularly to FIG. 1, there is illustrated a block diagram of a buck converter operating in the diode emulation mode of operation. A control circuit 102 provides control signals to an upper gate switching transistor 104 and a lower gate switching transistor 106. The upper gate switching transistor is a P-channel transistor having its drain/source path connected between the input voltage node $V_{IN}$ and the phase node 108. The lower gate switching P-channel transistor 106 is connected between the phase node 108 and ground. An inductor 110 is connected between the phase node 108 and the output voltage node 112 for the output voltage $V_{OUT}$. A load capacitor 114 is connected between node 112 and ground. In the diode emulation mode of operation, the lower gate switching transistor 106, which is shown in dashed lines, is turned off such that it operates like a diode as illustrated at 116 using its body diode. During start up conditions, if a pre-bias voltage exists across the capacitor 114, this pre-bias voltage should not be discharged when the controller circuit 102 is starting up. Ideal performance conditions would be to provide a monotonic increase of the output voltage across the output capacitor 114. The solution described herein below, is based upon a buck converter within the diode emulation mode of operation having the lower gate switching transistor 106 turned off. The process is similar to having a standard buck converter and increasing the reference voltage $V_{REF}$ until it equals the V_softstart voltage and initiating the synchronous mode of operation when these voltages are equal.

Figure 2:
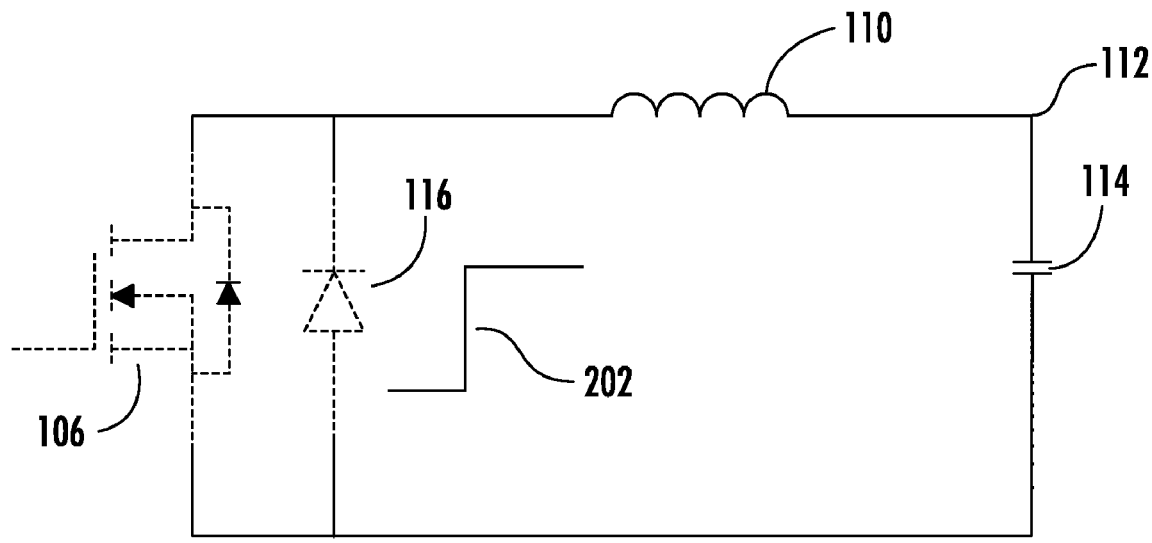
FIG. 2 illustrates the operation of the buck converter when converting from diode emulation mode to synchronous mode of operation.

Referring now to FIG. 2, there is illustrated the equivalent circuit when the buck regulator is transitioning from diode emulation mode to synchronous mode. This transition behaves like a step function 202 is being applied to the LC filter consisting of output capacitor 114 and inductor 110. In prior art methods, this condition would cause the control loop to respond and the circuit would end up with an overshoot or undershoot condition at the output voltage node 112 depending upon the loop design. The proposed technique involves running the buck converter in a diode emulation mode but when the first PWM pulse occurs, the lower gate switching transistor 106 has its switching cycle increased linearly from zero (diode emulation mode) to 1-d (where d is equal to the duty cycle). The first PWM pulse is defined in the following manner. When a prebias voltage is on the output, no PWM pulse is provided when the converter is turned on. The first PWM pulse will be given when the softstart voltage reaches the prebias voltage.

Figure 3:
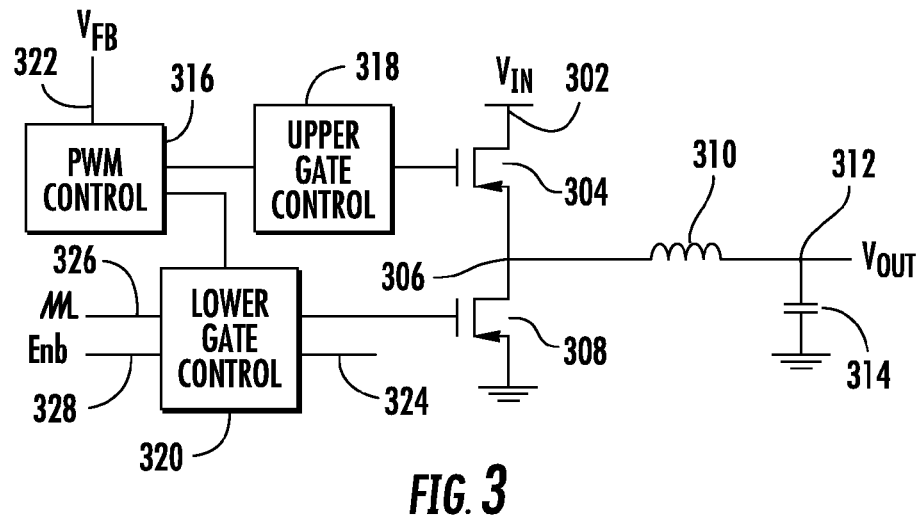
FIG. 3 is a functional block diagram of a buck regulator including control circuitry for the lower gate for providing a quasi transition diode emulation mode.

Referring now to FIG. 3, there is provided a general block diagram of the circuitry for operating a buck regulator in this fashion. As described previously with respect to FIG. 1, the input voltage $V_{IN}$ is applied at node 302 to a first side of P-channel transistor 304. The drain/source path of P-channel transistor 304 is connected between node 302 and the phase node 306. The lower gate switching transistor 308 comprises a P-channel transistor having its drain/source path connected between node 306 and ground. An inductor 310 is connected between node 306 and the output voltage node 312 for providing the output voltage $V_{OUT}$. A load capacitor 314 is connected between node 312 and ground. A PWM control block 316 provides PWM control signals to the upper gate control logic 318 and the lower gate control logic 320 responsive to a voltage feedback signal $V_{FB}$ from the output voltage node provided at an input 322. The upper gate control logic 318 controls the gate drive control signals to the upper gate switching P-channel transistor 304. The lower gate control logic 320 provides the drive signals to the lower gate switching transistor 308. The lower gate control logic 320 also provides an enable_pfm_mode (enable pulse frequency modulation mode) signal at pin 324. When the load current goes below certain level, the inductor current may became negative, to prevent this from happening the circuit enters diode emulation mode. During prebias startup the circuit will do the reverse and when the circuit reaches diode emulation mode stage, the controller moves into the PFM mode of operation. The lower gate control logic generates the gate drive signals and the PFM enable signals responsive to the PWM control signals from PWM control block 316, a ramp signal provided at pin 326 and an enable signal provided at pin 328.

Figure 4:
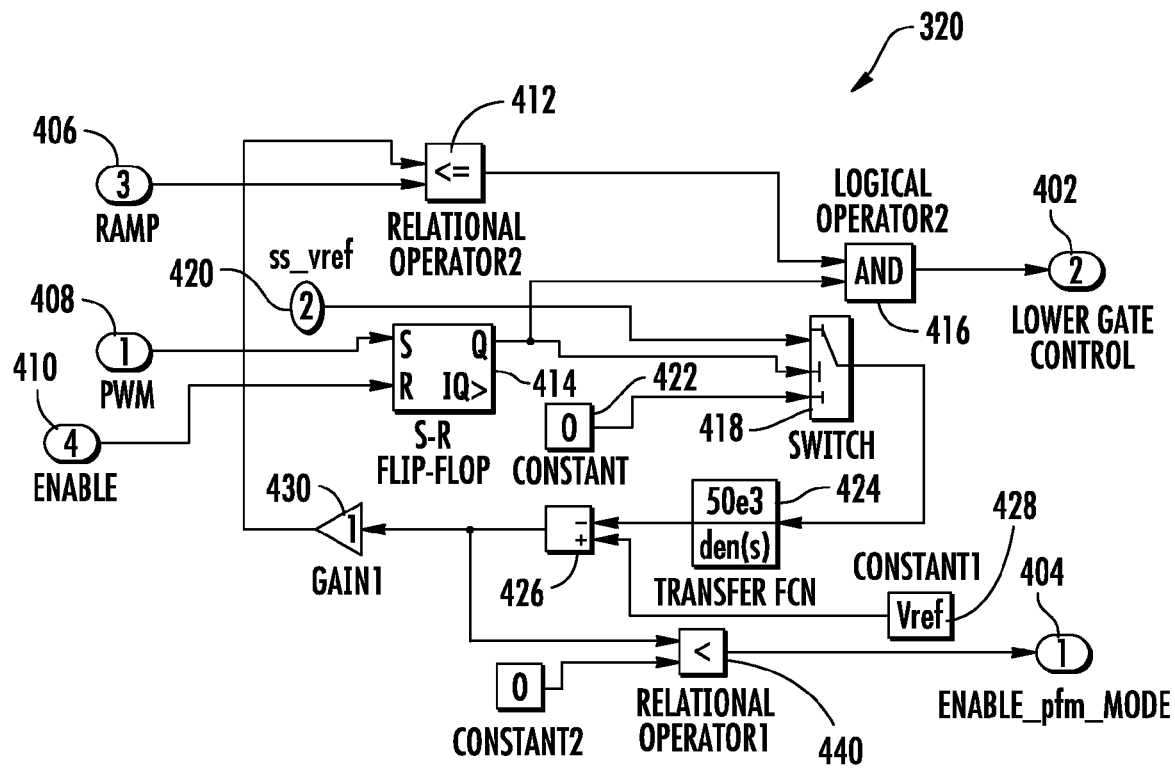
FIG. 4 is a functional block diagram of the proposed circuitry for controlling operation at the lower gate of the buck regulator during transition from diode emulation mode to synchronous mode.

Referring now to FIG. 4, there is provided a more detailed illustration of the lower gate control logic 320. Node 402 provides the lower gate drive control signal to the gate of switching transistor 308. Node 404 provides an enable signal for the pulse frequency mode of operation. Node 404 is connected to a circuit that provides a control signal for controlling the transition from PWM to PFM mode. Inputs to the lower gate control logic 320 comprise the ramp voltage signal which is provided at node 406, the PWM control signal provided from the PWM control block 316 at node 408 and an enable signal provided from the external user to enable the IC by puling low the signal at node 410.

The ramp signal provided at node 406 is input to a first input of relational operator 412. The relational operator 412 performs a comparison between the ramp signal and a filtered signal which is generated in a manner which will be more fully described herein below. The relational operator 412 determines whether the ramp signal is greater than or equal to the filtered signal. The PWM signal received at node 408 from the PWM control logic 316 is applied to the S input of an SR flip-flop 414. The R input of the SR flip-flop 414 is connected to the enable signal at node 410. The Q output of the SR flip-flop 414 is applied to one input of an AND gate 416. The other input of AND gate 416 is connected to the output of the relational operator 412. The output of AND gate 416 provides the lower gate control signal to node 402.

The Q output of the SR flip flop 414 is also provided to one pole of a switch 418. The switch 418 provides a zero value to the filter 424 until a first pulse at node 408 sets the flip-flop 414. Other inputs to the switch 418 are connected to the reference voltage ss_vref at node 420 and a constant value ground signal at node 422 for clearing the filter 424. The ss_vref is a reference voltage plus a delta V. This is used for saturating the filter 424 above the $V_{REF}$ of the controller. When the PWM signal goes to a logical "high" level at the input of flip flop 414, the low enable signal sets the flip-flop to provide either a 1 or 0 at its output to the switch 418. When the control input signal to the switch 418 is zero, it passes 0 at its output to filter 424, and when the control signal is 1, the switch 418 passes ss_vref to its output to filter 424. The filter 424 filters the signal from switch 418 and generates a linearly increasing lower gate signal. The output of the filter 424 is provided to the negative input of a unity gain amplifier 426 while the positive input of the unity gain amplifier 426 is connected to receive the reference voltage $V_{REF}$ 428. The unity gain amplifier 426 compares the linearly increasing output from filter 424 with the reference voltage $V_{REF}$. When the output of unity gain amplifier 426 is $V_{REF}$, the output is always higher than the ramp signal at node 406. Thus, the output of node 402 is 0 and the lower switch will not turn on leaving the circuit in diode emulation mode. As the output of unity gain amplifier 426 moves lower than the peak of the ramp signal at node 406, larger an larger high pulses on the output of relational operator 412 and the lower MOSFET switch can be turned on for longer and longer periods of time. When the output of unity gain amplifier 426 is below zero, the lower mosfet switch will be turn on at the pulse generated by the converter and this circuit will be out of the picture. When the output of unity gain amplifier 426 is below 0, the circuit that controls pulse frequency modulation (PFM) mode is enabled. The circuit that controls the PFM mode should not be enabled until the linear diode emulation circuit is out of the picture. When the filter output is above $V_{REF}$, the negative output from unity gain amplifier 426 will be lower than the offset of ramp 406 and the lower gate will receive the full PWM pulse when added with the output of 402 and the diode emulation off transition cycle is complete. An indication of the transition from the diode emulation cycle to the synchronous mode of operation will also be provided at node 404 after the output of filter 424 becomes higher than $V_{REF}$ 428. The output of the unity gain amplifier 426 is provided through a unity gain amplifier 430 which is provided as the filtered signal input to the relational operator 412. The relational operator 412 to determine whether the filtered signal provided by the unity gain amplifier 430 is greater than or equal to the ramp voltage being provided at node 406. When the output of the filter indicates that the regulator has transitioned to the synchronous mode of operation the output of the relational operator 412 will go to a logical "high" level. When the output of the relational operator 412 goes to a logical "high" level the output of the AND gate 416 will output the lower gate PWM control signal provided from the Q output of the flip-flop 414 responsive to the PWM control signal applied at node 408. The output of the unity gain amplifier 426 is also provided as an input to relational operator 440. When the controller wants the circuit to go into PFM mode, the controller will reset the switch 418 by driving the enable input high at node 410. At some point the output of unity gain amplifier 426 will be negative that will push the enable_pfm_mode output at node 404 high to initiate the PFM mode for the circuit. Relational operator 440 determines whether the output of the unity gain amplifier 426 is greater than a ground signal applied to the other input of relational operator 440. The output of the relational operator 440 comprises an enable_pfm_mode signal at node 404. The enable_pfm_mode signal indicates the beginning of the pulse frequency modulation mode of operation of the unity gain amplifier 426. The pulse frequency mode of operation is also known as the pulse skipping mode. This mode is entered after entering the diode emulation mode when the load current is low.

In operation, the circuit of FIG. 4 receives a first pulse from the PWM control block 316 (FIG. 3) at node 406 which is provided to the S input of the SR flip-flop 414. The R input of the SR flip-flop 414 receives the enable input from node 410. Node 408 receives a one shot trigger. After the first pulse, the output of flip-flop 414 will be zero so during operation if we want to go into PFM mode, the node 410 will go high and reset flip-flop 414. This causes the output of filter 424 to decrease linearly below vref and this will cause the pulses of the lower gate to be linearly overridden until they became zero (diode emulation). The device then enters the PFM mode. The enable input is responsible for driving the R input high which drives the Q output low when the S input is low. The enable signal comes from the common controller of the buck converter. The output of the SR flip-flop is provided at the Q output and reflects the pulse provided from the PWM controller at node 408 when the S input goes to a logical "high" level and is held at this level until the R input goes high while the S input is at a logical "low" level. The Q output is ANDed at AND gate 416 with the output of relational operator 412. The relational operator 412 compares the ramp voltage at node 406 with the filtered output from the unity gain amplifier 430. When a logical "high" pulse is received from both the SR flip-flop 414 and the relational operator 412, the AND gate will output a logical "high" level indicating that the lower gate switching transistor is to be turned on at node 402. The output of relational operator 412 controls the maximum lower gate PWM signal during prebias. After prebias, the output of relational operator 412 is always high such that when the output is anded with the lower gate PWM signal at AND gate 416 to provide the entire lower gate PWM signal. Likewise, if either of the outputs from relational operator 412 or SR flip-flop 414 are at a logical "low" level, the lower gate control signal at node 402 will be at a logical "low" level.

The signal from the Q output of the SR flip-flop 414 is also provided to the switching circuit 418. Switch 418 selects between the ss_vref input and the constant ground input based upon the output of the flip flop 414. The selected one of these signals are filtered by a filter 424 in order to create a smooth diode emulation transition from the diode emulation mode of operation to the synchronous mode of operation. The output of the filter 424 is compared with a reference voltage 428 within the unity gain amplifier 426. The comparator output is provided through a unity gain amplifier 430 as the filtered output to be compared with the ramp voltage at the relational operator 412. The output of the unity gain amplifier 426 is also provided to a relational operator 440 for determination of when the filter output is greater than some constant value. When the output of the relational operator 440 goes to a logical "high" level, indicating the filter output is higher than this constant, a logical "high" signal at node 404 indicates that the diode emulation mode is over and the pulse frequency modulation mode is enabled.

Figure 5:
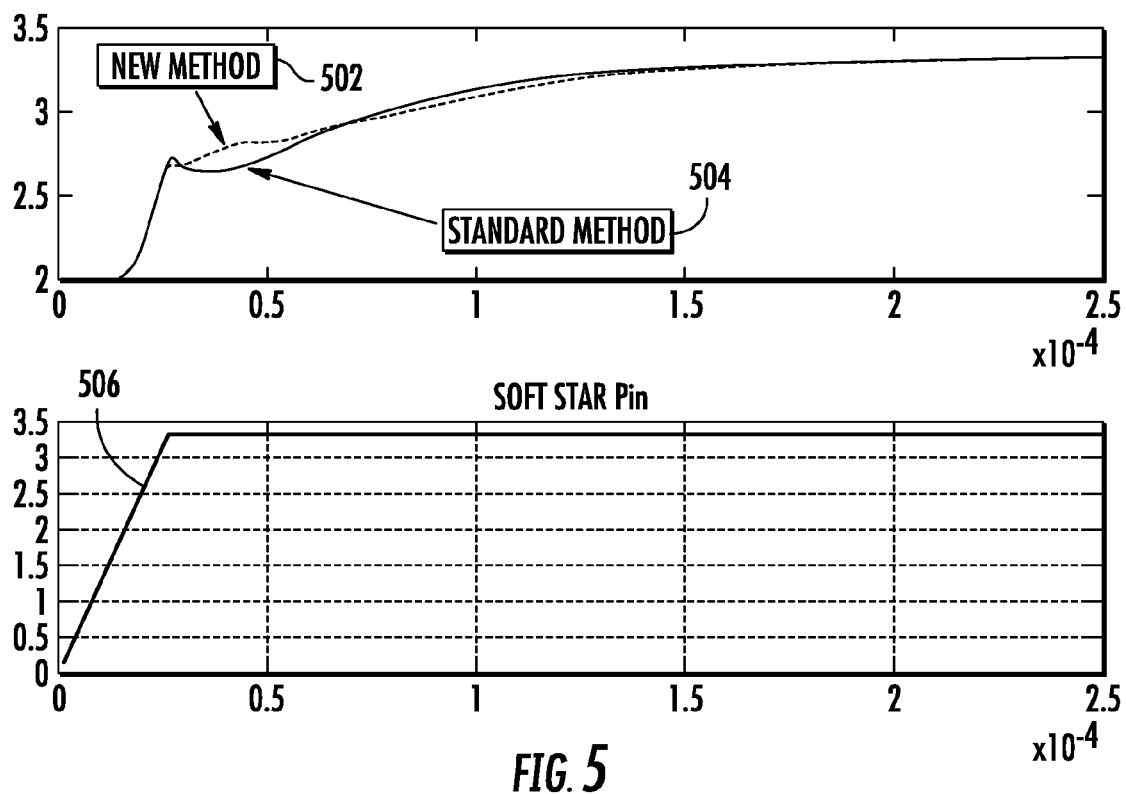
FIG. 5 illustrates the output voltage using the prior art method of operation and the new method of operation.

Referring now to FIG. 5, there is illustrated the output voltage waveform response with respect to the operation of the circuitry described with respect to FIG. 4 and a prior art method. The new method implemented by the circuitry of FIG. 4 provides the output voltage response as indicated generally at waveform 502. This may be compared with the standard output voltage response indicated generally by the waveform 504. The error of the output voltage and the final value of $V_{REF}$ are passed through a low pass filter 424 and the output of the filter is compared with the ramp voltage at relational operator 412. This process will generate a logical "high" signal at the output of the relational operator 412 which will be ANDed with the lower gate PWM control signal provided by the synchronous controller at node 408. The final gate signal of the lower gate during soft start is the output of the ANDed results of AND gate 416 which is illustrated by the waveform 506.

Figure 6:
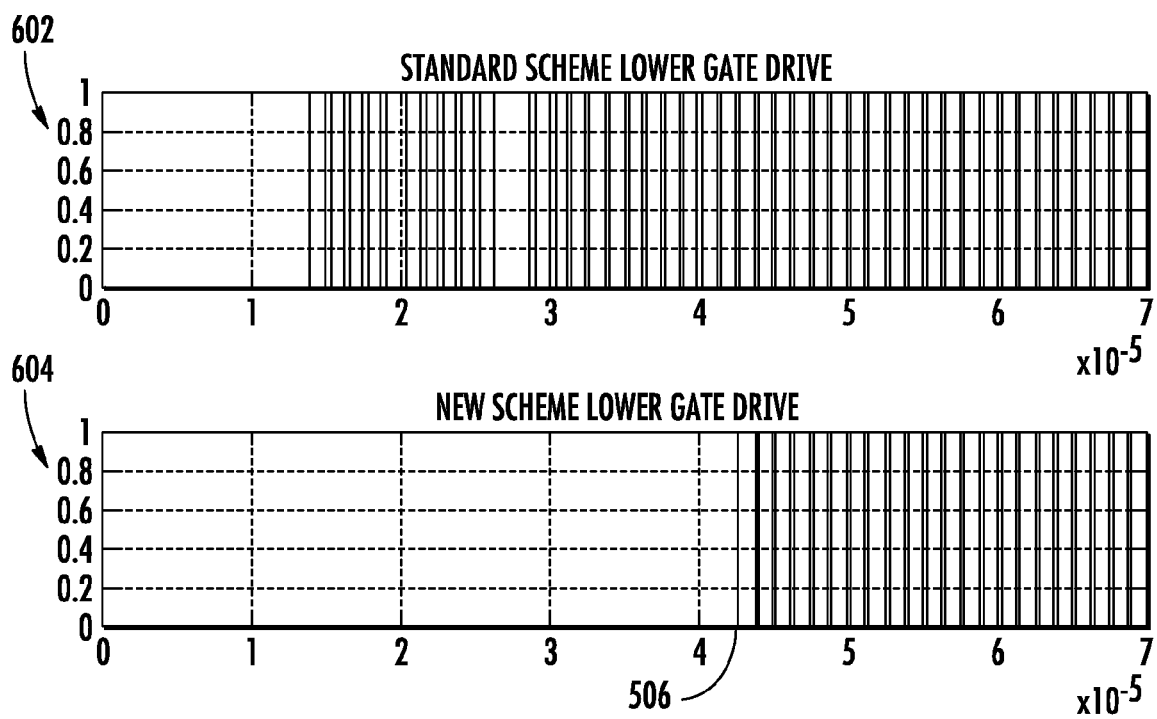
FIG. 6 illustrates the lower gate drive for both prior art and new transition schemes.

FIG. 6 illustrates the lower gate drive signal provided at node 402 using the standard method as illustrated generally at 602 and the method implemented by the circuit of FIG. 4 as illustrated generally at 604. The idea is to not have a step transition from 0 PWM to 1-D PWM on the lower MOSFET but to have a linear transition from 0 PWM to 1-D PWM. As can be seen, a linear transition from 0 PWM to 1-d PWM is initiated in the graph illustrated generally at 604 at point 606. While the illustration at 602 shows more of a step transition as provided previously.

Using the above described system and method of operation, overshoot or undershoot may be eliminated from the buck converter during the transition from diode emulation mode of operation to synchronous mode of operation. This provides a monotonic soft start without output voltage drooping.

It will be appreciated by those skilled in the art having the benefit of this disclosure that this voltage regulator provides improved transition between a diode emulation mode of operation and a synchronous mode of operation. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A voltage regulator comprising:
   an upper switching transistor connected between an input voltage node and a phase node;
   a lower switching transistor connected between the phase node and ground;
   an output filter connected between the phase node and an output voltage node;
   a PWM control circuit for generating a PWM control signal responsive to a feedback voltage;
   an upper gate control circuit for controlling operation of the upper switching transistor responsive to the PWM control signal; and
   a lower gate control circuit for controlling operation of the lower switching transistor responsive to the PWM control signal and a ramp voltage signal, wherein responsive to a first pulse in the PWM control signal the lower gate control circuit linearly increases a switching cycle of a lower gate control signal from 0 to (1-D), where D=the duty cycle, to transition the voltage regulator from diode emulation mode of operation to synchronous mode of operation.

2. The voltage regulator of claim 1, wherein a smooth transition from the diode emulation mode maybe enabled/disabled responsive to an external enable signal.

3. The voltage regulator of claim 1, wherein the lower gate control circuit further comprises:
   a flip flop circuit connected to receive the PWM control signal;
   a filter circuit for generating a linear lower gate pulse that will be logically combined with the lower gate control signal and when the linear lower gate pulse of the filter is higher than a reference voltage for generating an indication of transition from the diode emulation mode of operation to the synchronous mode of operation;
   first control logic responsive to the PWM control signal output for the flip flop circuit, the ramp voltage signal and the indication of transition from the filter circuit for generating a lower gate control signal for controlling the operation of the lower switching transistor.

4. The voltage regulator of claim 1, wherein the lower gate control circuit further comprises second control logic for generating a flag indicating an end of the diode emulation mode of operation responsive to the indication of transition from the diode emulation mode of operation and a constant value.

5. The voltage regulator of claim 3, wherein the filter circuit further comprises a switch having a control input connected to receive the PWM control signal, a first input connected to receive a reference voltage, a second input connected to receive a constant value and an output, wherein the switch applies the reference voltage to the output to saturate the filter responsive to the PWM control signal at a first logical level and applies the constant value to the output to clear the filter responsive to the PWM control signal at a second logical level.

6. A voltage regulator comprising:
an upper switching transistor connected between an input voltage node and a phase node;
a lower switching transistor connected between the phase node and ground;
an output filter connected between the phase node and an output voltage node;
a PWM control circuit for generating an PWM control signal responsive to a feedback voltage;
an upper gate control circuit for controlling operation of the upper switching transistor responsive to the PWM control signal; and
a lower gate control circuit for controlling operation of the lower switching transistor responsive to the PWM control signal and a ramp voltage signal, wherein responsive to a first pulse in the PWM control signal the lower gate control circuit linearly increases a lower gate control signal from 0 to (1-D), where D=the duty cycle, to transition the voltage regulator for diode emulation mode of operation to synchronous mode of operation, wherein the lower gate control circuit further comprises:
a flip flop circuit connected to receive the PWM control signal;
a filter circuit for generating a linear lower gate pulse that will be logically combined with the lower gate control signal and when the linear lower gate pulse of the filter is higher than a reference voltage for generating an indication of transition from the diode emulation mode of operation to the synchronous mode of operation;
first control logic responsive to the PWM control signal output for the flip flop circuit, the ramp voltage signal and the indication of transition from the filter circuit for generating a lower gate control signal for controlling the operation of the lower switching transistor.

7. The voltage regulator of claim 6, wherein a smooth transition from the diode emulation mode maybe enabled/disabled responsive to an external enable signal.

8. The voltage regulator of claim 6, wherein the lower gate control circuit further comprises second control logic for generating a flag indicating an end of the diode emulation mode of operation responsive to the indication of transition from the diode emulation mode of operation and a constant value.

9. The voltage regulator of claim 6, wherein the filter circuit further comprises a switch having a first input connected to receive the PWM control signal, a second input connected to receive a reference voltage, third input connected to receive a constant value and an output, wherein the switch applies the reference voltage to the output to saturate the filter, the switch applies the constant value to the output to clear the filter and the switch applies the PWM control signal to the filter after the filter has been saturated.

10. A method of transitioning a voltage regulator from a diode emulation mode of operation to a synchronous mode of operation, comprising the steps of:
generating an PWM control signal responsive to a feedback voltage;
controlling operation of an upper switching transistor of the voltage regulator responsive to the PWM control signal in the diode emulation mode of operation;
controlling operation of the lower switching transistor of the voltage regulator responsive to the PWM control signal and a ramp voltage signal in the diode emulation mode of operation; and
linearly increasing a switching cycle of a lower gate control signal from 0 to (1-D), where D=the duty cycle, to transition the voltage regulator from the diode emulation mode of operation to the synchronous mode of operation responsive to a first pulse in the PWM control signal.

11. The method of claim 10, further including the step of disabling/enabling a smooth transition from the diode emulation mode responsive to an external enable signal.

12. The method of claim 10, wherein the step of linearly increasing further comprises the steps of:
receiving the PWM control signal;
filtering the PWM control signal;
generating an indication of transition from the diode emulation mode of operation to the synchronous mode of operation;
generating a lower gate control signal for controlling the operation of a lower switching transistor responsive to the PWM control signal output for a flip flop circuit, the ramp voltage signal and the indication of transition from the filter circuit.

13. The method of claim 10, further comprising the step of generating a flag indicating an end of the diode emulation mode of operation responsive to the indication of transition from the diode emulation mode of operation and a constant value.

14. The method of claim 12, wherein the step of filtering further comprises the step of:
receiving the PWM control signal, a reference voltage and a constant value;
applying the reference voltage to the output to saturate the filter;
applying the constant value to the output to clear the filter; and applying the PWM control signal to the filter after the filter has been saturated.

* * * * *